(12) United States Patent
Ceja

(10) Patent No.: US 8,720,962 B2
(45) Date of Patent: May 13, 2014

(54) SHOVEL

(71) Applicant: Louis Ceja, Midlothian, IL (US)

(72) Inventor: Louis Ceja, Midlothian, IL (US)

(*) Notice: Subject to any disclaimer, the term of this patent is extended or adjusted under 35 U.S.C. 154(b) by 0 days.

(21) Appl. No.: 13/674,156

(22) Filed: Nov. 12, 2012

(65) Prior Publication Data

US 2013/0119684 A1   May 16, 2013

Related U.S. Application Data

(60) Provisional application No. 61/558,186, filed on Nov. 10, 2011.

(51) Int. Cl.
*A01B 1/00* (2006.01)
*A01D 9/00* (2006.01)
*A01D 11/00* (2006.01)

(52) U.S. Cl.
USPC .......................................................... 294/49

(58) Field of Classification Search
USPC ........ 294/49, 51, 54.5, 55.5, 59; 37/264, 265, 37/266, 285, 903; 7/114–116, 158; 15/236.01–236.02, 236.08; 30/164.5, 30/164.7, 164.8, 136–137
See application file for complete search history.

(56) References Cited

U.S. PATENT DOCUMENTS

| | | | |
|---|---|---|---|
| 39,012 A | | 6/1863 | Goodrem et al. |
| 339,527 A | | 4/1886 | Calef et al. |
| 647,724 A | | 4/1900 | McCoy et al. |
| 674,117 A | | 5/1901 | Lefebvre et al. |
| 969,307 A | | 10/1910 | Sumerlin et al. |
| 1,435,061 A | | 11/1922 | Halsey et al. |
| 1,504,913 A | | 8/1924 | Simoncelli et al. |
| 1,959,847 A | * | 5/1934 | Van Buskirk .................. 37/450 |
| 2,429,120 A | | 10/1947 | Brandt et al. |
| 3,226,149 A | | 12/1965 | McJohnson et al. |
| 4,748,754 A | | 6/1988 | Schwappach |
| 4,865,372 A | * | 9/1989 | Gabriel .......................... 294/49 |
| 5,063,696 A | | 11/1991 | Smith |
| 5,088,214 A | * | 2/1992 | Jones ............................. 37/450 |
| 5,791,706 A | | 8/1998 | Dolci |
| 5,816,632 A | | 10/1998 | Baldacci |
| 6,568,729 B2 | | 5/2003 | Bailey |
| 2006/0059857 A1 | * | 3/2006 | Kuhns et al. ................. 52/749.1 |
| 2006/0225313 A1 | * | 10/2006 | McClanahan et al. .......... 37/450 |

* cited by examiner

*Primary Examiner* — Stephen Vu
(74) *Attorney, Agent, or Firm* — Matthew De Preter; Rockey & Lyons

(57) ABSTRACT

A manually operated shovel having a blade and a plurality of tooth members is provided. The tooth members of the shovel provide individual points of contact between the shovel blade and material, such as earth, when the blade of the shovel is pressed into the material. The tooth members provide a mechanical advantage that focuses the pressure applied to the shovel by the operator so as to penetrate material more easily than traditional uniformly bladed shovels.

12 Claims, 3 Drawing Sheets

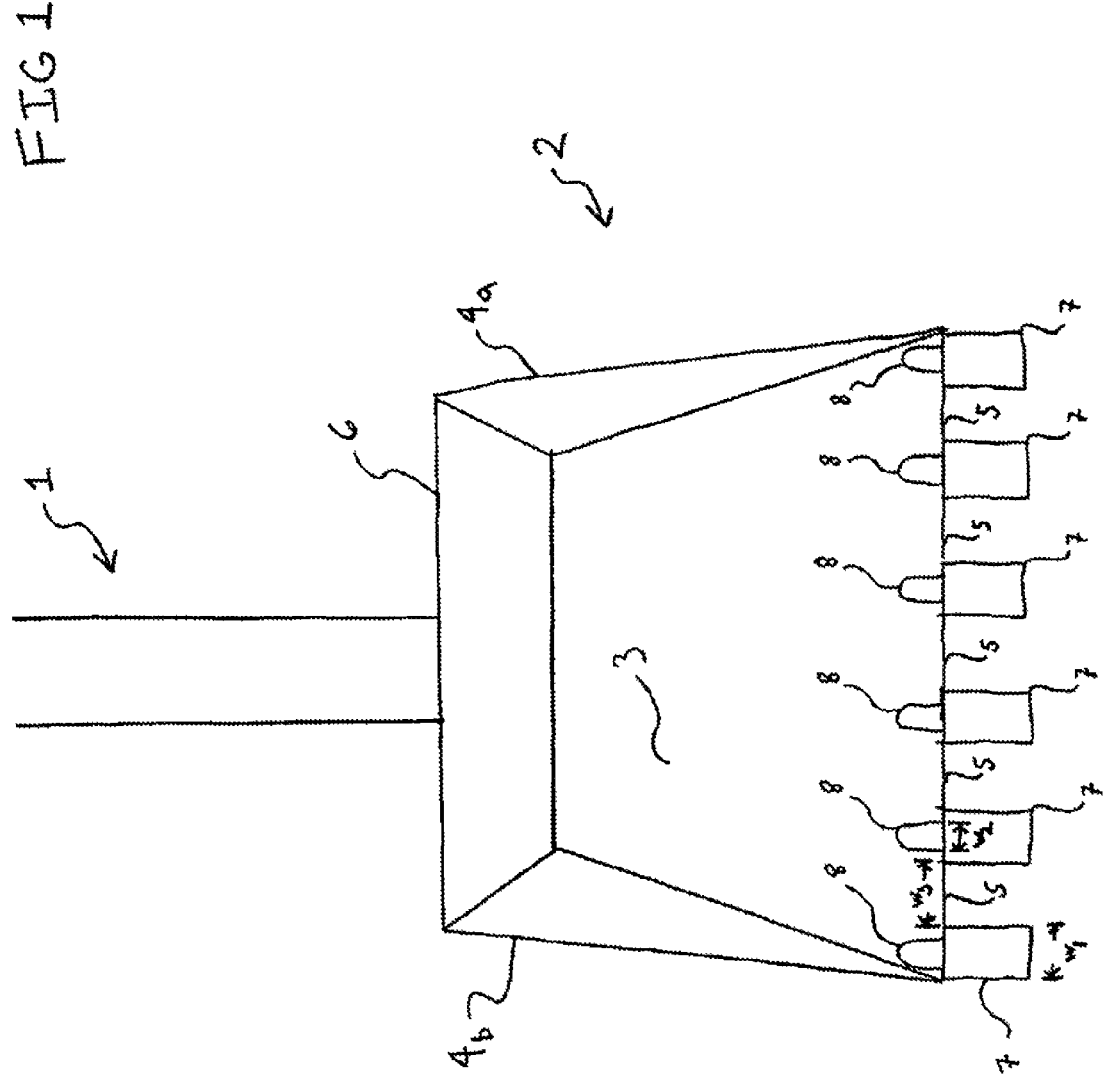

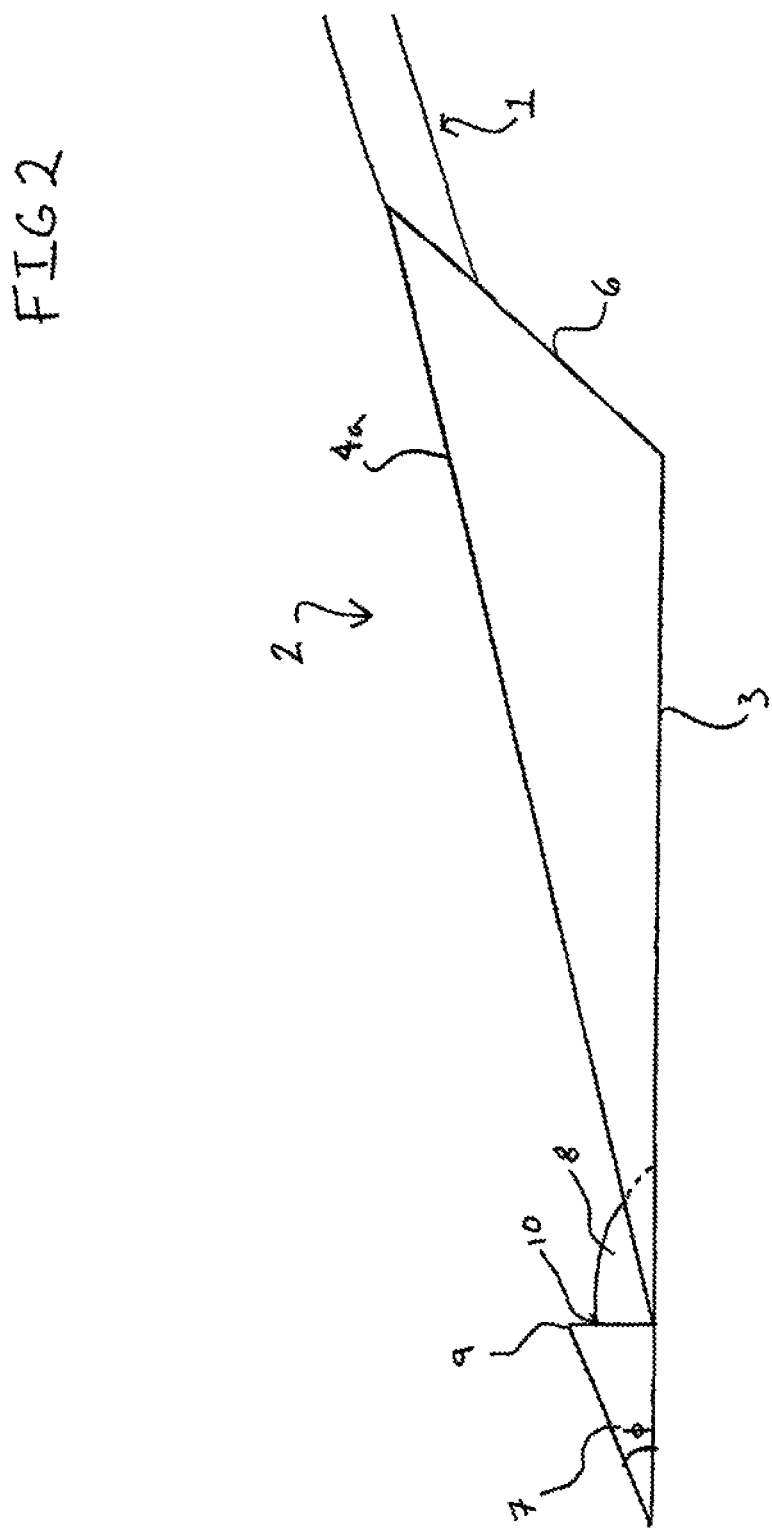

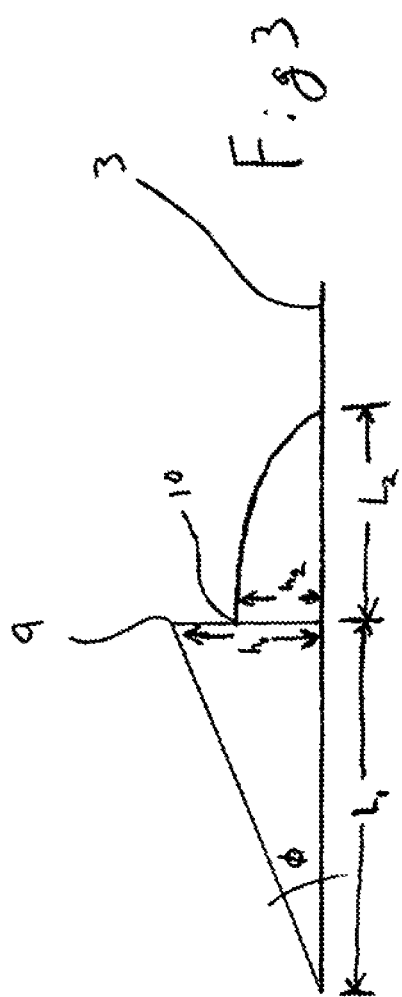
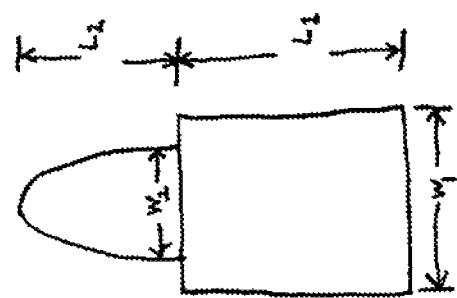

SHOVEL

CROSS-REFERENCE TO RELATED APPLICATION:

This application claims priority to U.S. Provisional Application Ser. No. 61/558,186 filed Nov. 10, 2011, the entirety of which is incorporated herein by this reference.

FIELD OF INVENTION

The present invention generally relates to an improved shovel design. Specifically, the invention includes a plurality of tooth members extending from the blade portion of the shovel. The invention is designed easily manually manipulated by an individual and may be used in a variety of applications such as digging in earth or snow as well as others.

BACKGROUND OF THE INVENTION

Manually operated shovels for digging in and moving earth and snow are widely used. In the past, shovels generally included a broad blade and a handle extending from the blade. Some shovel blades included a substantially flat blade portion that terminated in squared edge, others included a slightly curved blade portion that tapered from a wide section to a triangular point. Additional shovels have included blades with either a rounded edge or even a serrated edge. In all of the aforementioned styles, the blade portion is formed of a uniform gauge of material, usually steel, that is cut and bent into a desired shape thereby forming the blade portion of the shovel. A handle is then attached to the blade.

The problem with the aforementioned shovels is that the blade portion of the shovel is difficult to push into material. Despite having a thin edge, the overall surface area of the blade drags significantly on the material regardless of whether the blade terminates in a squared edge, rounded edge, tapered or triangular edge or even a serrated edge. In each instance the thickness of the edge is substantially the same as the thickness of the blade. Thus when the edge penetrates a plane of a material, the surface area of the blade comes into contact with the material. As the shovel blade progresses into the material, an increasing amount of blade surface comes into contact with the material creating friction, making it increasingly harder for an operator to penetrate the material. Additionally, because the shovel blades are of substantially uniform thickness, a suction may be created between the blade and the material making it difficult for the operator to both continue to penetrate the material and extract the blade from the material.

SUMMARY OF THE INVENTION

The shovel of the present invention includes a handle and a blade. The blade comprises a substantially flat blade having a front edge at a distal end and a back section extending at an upward angle from the blade, the handle being attached to the raised back section, two raised side portions extending at upward angles from the blade and attached to both the blade and the back section, the side portions further extending down from the raised back section to the distal end of the blade such that the side portions taper from the raised back section to the edge of the blade forming substantially triangular walls on either side of the blade.

Additionally, the shovel includes a plurality of teeth attached to the front edge of the blade. Each tooth is essentially a wedge extending outward from the edge of the blade where the flat side of the wedge is attached to the blade edge. Each tooth is secured to the edge of the blade by a supporting rib. The rib is a mass of material that extends into the flat blade to provide support structure for the tooth.

The unique design of the improved shovel exhibits a number of advantages. The teeth of the shovel focus force applied to the blade by an operator so as to allow for easier penetration by the shovel into material. By requiring less force to operate than a traditional shovel, the improved shovel alleviates stress to the operator.

The teeth and ribs further break apart solid material as the blade penetrates deeper into material thereby relieving friction and suction forces that act on traditional blades. Thus less overall effort need be expended by an operator while manipulating the improved shovel. The relatively thick teeth further prevent unnecessary wear to the thin blade. The thicker teeth provide a primary point of impact against material and prevent the thin blade from being ground down or damaged by hard or abrasive material, such as gravel, asphalt or concrete, when the shovel is used to scrape and/or penetrate such material, thereby adding to the longevity of the tool.

The toothed blade also provides the added benefit of operating in a multipurpose manner. The teeth provide added leverage for wedging, prying and lifting debris, allowing for an operator to separate material that is stuck together, such as separating tile from a floor or ice from a sidewalk. The flat blade is designed to marry to other flat surfaces, such as floors or sidewalks so as to slide smoothly along such surfaces without gouging and marring the surfaces as can easily occur when operating a traditional rounded shovel blade or thinly tined pitchfork. Also the teeth on the ends of the shovel blade, by protruding beyond the edge of the wide, flat blade enable the improved shovel to access tight spaces.

DESCRIPTION OF THE DRAWINGS

FIG. 1 is a top down view of the blade portion of the shovel.
FIG. 2 is a side view of the blade portion of the shovel.
FIG. 3 is a side view of a tooth.
FIG. 4 is a top down view of a tooth.

DESCRIPTION OF THE PREFERRED EMBODIMENT OF THE INVENTION

The preferred embodiments of the present invention are described with reference to the drawings below. In the drawings, like numbers are used to refer to like elements. The following is a description of the preferred embodiment of the present invention.

Referring to FIG. 1, the improved shovel is made of two parts, a handle 1 and a blade 2. As shown in FIG. 1, the blade is generally square in shape, having base plate 3 a first side 4*a* and a second side 4*b*, a front edge 5, and a back 6. The handle 1 of the shovel is connected to the back portion 6 of the blade 2 such that an operator may apply force to the handle and thereby manipulate the blade of the shovel. Additionally, a number of teeth are connected to the blade of the shovel. Each tooth 7 is connected to the front edge of the blade.

Because the profile of the front edge is preferably thin, on the order of 0.0625-0.125 inches for example, there is very little material to provide a connection between the teeth an the blade. Thus, the blade includes ribs 8 at the front edge of the blade on the plate 3 to provide additional structural material for each tooth to connect to. In the preferred embodiment, the shovel blade is made of stamped metal, for example steel or aluminum, though it could also be made of plastic or of some other rigid material. Where the blade is metal, the rib may be a mass of metal welded to the blade and each tooth, likewise made of metal, may also be welded to the front edge of the blade and a rib. It should be appreciated that the blade, back, sides, blade, rib and tooth may be separate elements that are connected together (such as by welding). Alternately, the blade, sides, back, ribs and teeth may all be formed as an integrated unit. Such construction may be practicable where the shovel blade is cast as a single piece. In either instance, the various elements are considered connected together.

As shown on FIG. 1, the blade of the shovel includes a front edge 5. The front of each tooth 8 extends beyond the front edge and the back of each tooth terminates at the front edge. Preferably, the front of each tooth extends 1.5 inches out from the front edge 5. The font of each rib extends into the plate 3 from the front edge 5 and the back of each rib terminates at the front edge, such that for each tooth and rib pair, the back of the tooth and the back of the rib meet at the front edge 5. Preferably, each rib extends from the front edge 5 into the plate 3. Additionally, each tooth and each rib has a width. In the preferred embodiment, the width of each tooth is one inch, and the width of each rib is preferably equal to or less than the width of each tooth.

The plate 3 of the shovel blade is substantially flat and has two raised sides 4a and 4b as well as a raised back portion 6, each of which are shown in FIG. 1. In FIG. 2, a depiction of the side of the shovel, only one side 4a is shown along with the raised back portion 6. Preferably, each side, 4a and 4b, extends both upwardly and outwardly from the plate portion, and tapers down from the top of the back portion 6 to the front edge 5. The back portion 6 also extends upwardly and outwardly from the plate 3. Thus, the plate 3, sides 4a and 4b, and the back portion 6 provide a cavity for holding material, while directing overflow material away from the shovel blade.

The preferred structure of each tooth and rib will now be described with reference to FIG. 3 and FIG. 4. As discussed above, each tooth, rib and the plate may be separate pieces that are connected together, for example by welding, or may be cast or forged as a single unitary structure. Regardless of their overall formation, each exhibits particular characteristics. The plate is a substantially flat section of material that has a thickness less than that of both the ribs and the teeth. In the preferred embodiment, the height h1 of the tooth is approximately 0.5 inches, the height h2 of the rib is approximately 0.25 inches, the length L1 of the tooth is approximately 1.5 inches, the length L2 of the rib is approximately 1 inch, the width w1 of the tooth is approximately 1 inch and the with w2 of the rib is approximately 0.75 inches. Additionally, the preferred shape of the tooth is that of a right angle triangular wedge where the angle φ between the hypotenuse and the length is approximately 30 degrees and the angle between the hypotenuse and the height is approximately 60 degrees.

The teeth 8 are further connected to the plate 3 in a spaced pattern. Thus, between each tooth, there is a section of front edge 5. Preferably, the teeth are spaced at regular intervals along the font edge. For example, in the embodiment depicted in FIG. 1, the plate is, for example, twelve inches wide, each of the six teeth has a width w1 of one inch, and thus each of the five sections of front edge 5 has a width w3 of 1.2 inches. The teeth having a greater thickness than that of the plate, having a top point 9 above the top of the plate 3, and extending beyond the front edge 5 of the plate 3 provides a number of advantages over traditional shovels. The teeth concentrate the force applied to the handle of the shovel by an operator over a shorter overall width than the total width of plate 3. For example, in an embodiment of the present invention having an overall plate 3 width of twelve inches and having six teeth, each of width w1 of one inch, the force applied to the shovel blade at the moment of penetration into a material is concentrated into six one inch segments instead of being dispersed over the entire twelve inch width of the plate. Additionally, each tooth displaces material up and away from the plate 3 as the shovel blade 2 penetrates into material. The displacement of the material up and away from the plate helps reduce both creation of both suction and friction forces between the material and the plate 3.

Although the present invention has been described in terms of the preferred embodiments, it is to be understood that such disclosure is not intended to be limiting. Various alterations and modifications will be readily apparent to those of skill in the art. Accordingly, it is intended that the appended claims be interpreted as covering all alterations and modifications as fall within the spirit and scope of the invention.

What is claimed is:

1. A shovel comprising:
   a handle;
   a blade; said blade including a flat base plate having a front edge, a back section connected to and extending from said base plate, a first and a second side section extending from said base plate, wherein each of said first and second sections is connected to said base plate and said back section;
   a plurality of teeth, wherein each of said teeth extending from the front edge of the base plate and connected to at least one rib, each of said ribs being connected to the front edge of said base plate such that the front edge of each of said teeth and a length of the base plate, said length being measured from the front edge of the base plate to the back section, form an uninterrupted straight line along a bottom side of each of said teeth and a bottom side of the base plate wherein each of said teeth includes a back surface that is connected to said rib, said back surface including a of said teeth width and a of said teeth height, and each of said ribs includes a front surface, said front surface including a rib width and rib height such that said tooth width and tooth height are equal to or greater than the rib width and rib height, respectively;
   wherein said back section meets said base plate at an angle, said first side section meets said base plate at an angle, said second side sections meet said base plate at an angle and wherein said handle is connected to said back section.

2. The shovel as in claim 1, wherein each of said teeth is substantially wedge shaped having a base, top, back and sides, wherein the top and base of each of said teeth form an acute angle at the front of each of said teeth and the back and base form a right angle and wherein the front of each of said teeth and the back of each of said teeth have substantially the same width.

3. The shovel as in claim 2, wherein said rib has a length and a height and a width, said rib length being less than the length of the base of each of said teeth.

4. The shovel as in claim 2, wherein said rib has a length and a height and a width, said rib width being less that the width of the back of each of said teeth.

5. The shovel as in claim 2, wherein said rib has a length and a height and a width, said rib height being less than the height of the back of each of said teeth.

6. The shovel as in claim 2, wherein said rib has a length and a height and a width, said rib length being less that the length of the base of each of said teeth, said rib width being less than the width of the back of each of said teeth, and said rib height being less than the height of the back of each of said teeth.

7. The shovel as in claim 6, wherein the height of said at least one tooth is approximately 0.5 inches, the height of said at least one rib is approximately 0.25 inches, the length of said at least one tooth is approximately 1.5 inches, the length of said at least one rib is approximately 1 inch, the width of said at least one tooth is approximately 1 inch and the with of said at least one rib is approximately 0.75 inches.

8. The shovel as in claim 7, wherein an angle between the top of said at least one tooth and the base of said tooth is approximately 30 degrees and wherein an angle between the top of said tooth and the back of said tooth is approximately 60 degrees.

9. The shovel as in claim 2, wherein the plurality of teeth are distributed along the length of the front edge.

10. The shovel as in claim 9, wherein the distribution of teeth is such that the distance between each of said teeth along the front edge is substantially the same as the width of each of said teeth; each of said teeth having substantially the same width.

11. The shovel as in claim 2, wherein the base of said at least one tooth extends out from the blade such that the base of said tooth and the blade are in a same plane.

12. The shovel as in claim 1, wherein each of said first and second sections extends up and away from said base plate and wherein the back section extends up and away from said base plate, and wherein each of said first and second sections is connected to the base plate and the back section such that the side sections, back section and base form a cavity.

\* \* \* \* \*